July 21, 1964   F. N. PLATT   3,141,393
APPARATUS FOR OBTAINING ROADWAY PHOTOGRAPHS
Filed March 14, 1961   3 Sheets-Sheet 1
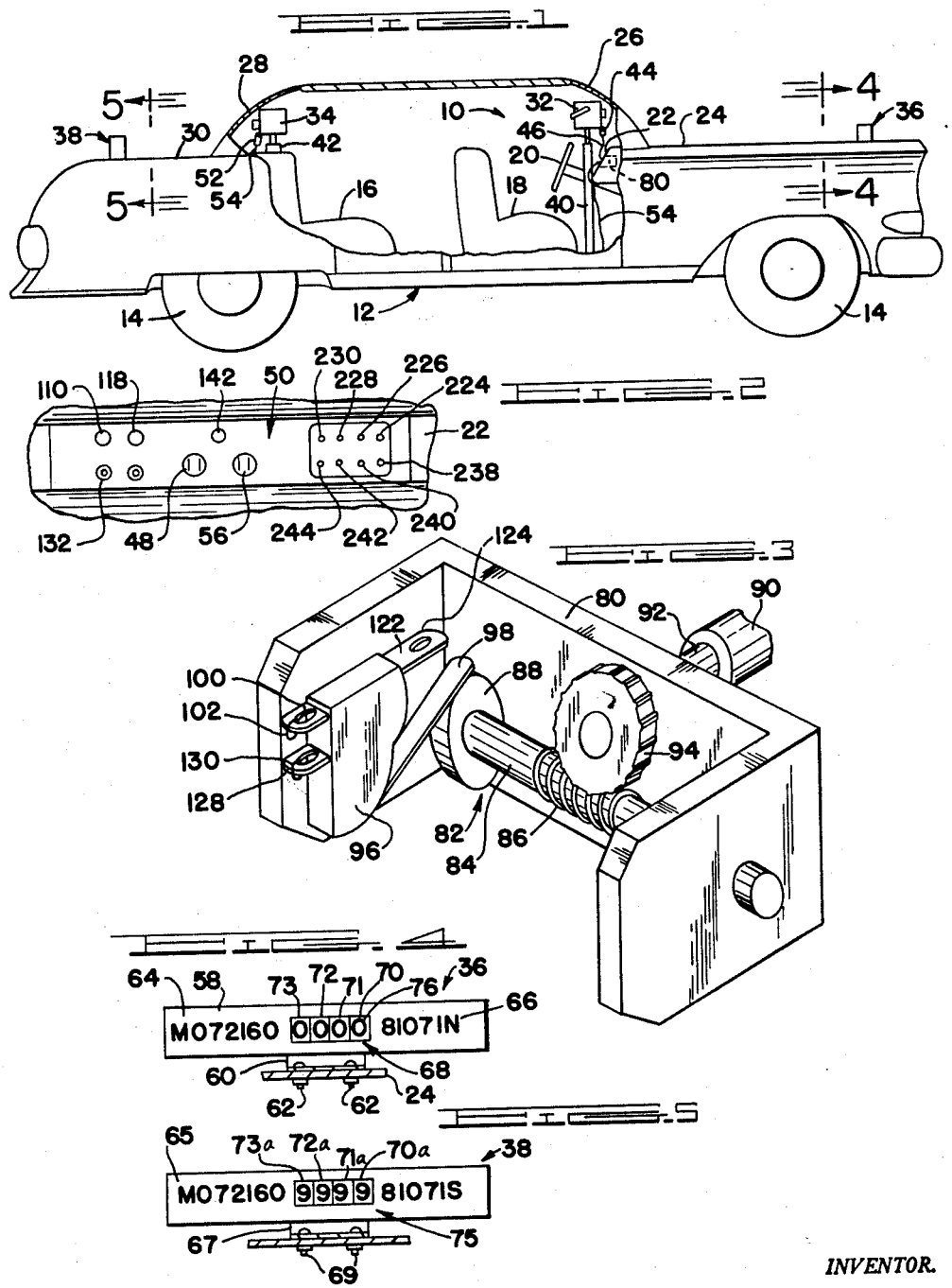
INVENTOR.
FLETCHER N. PLATT
BY
OLSEN AND STEPHENSON
ATTORNEYS

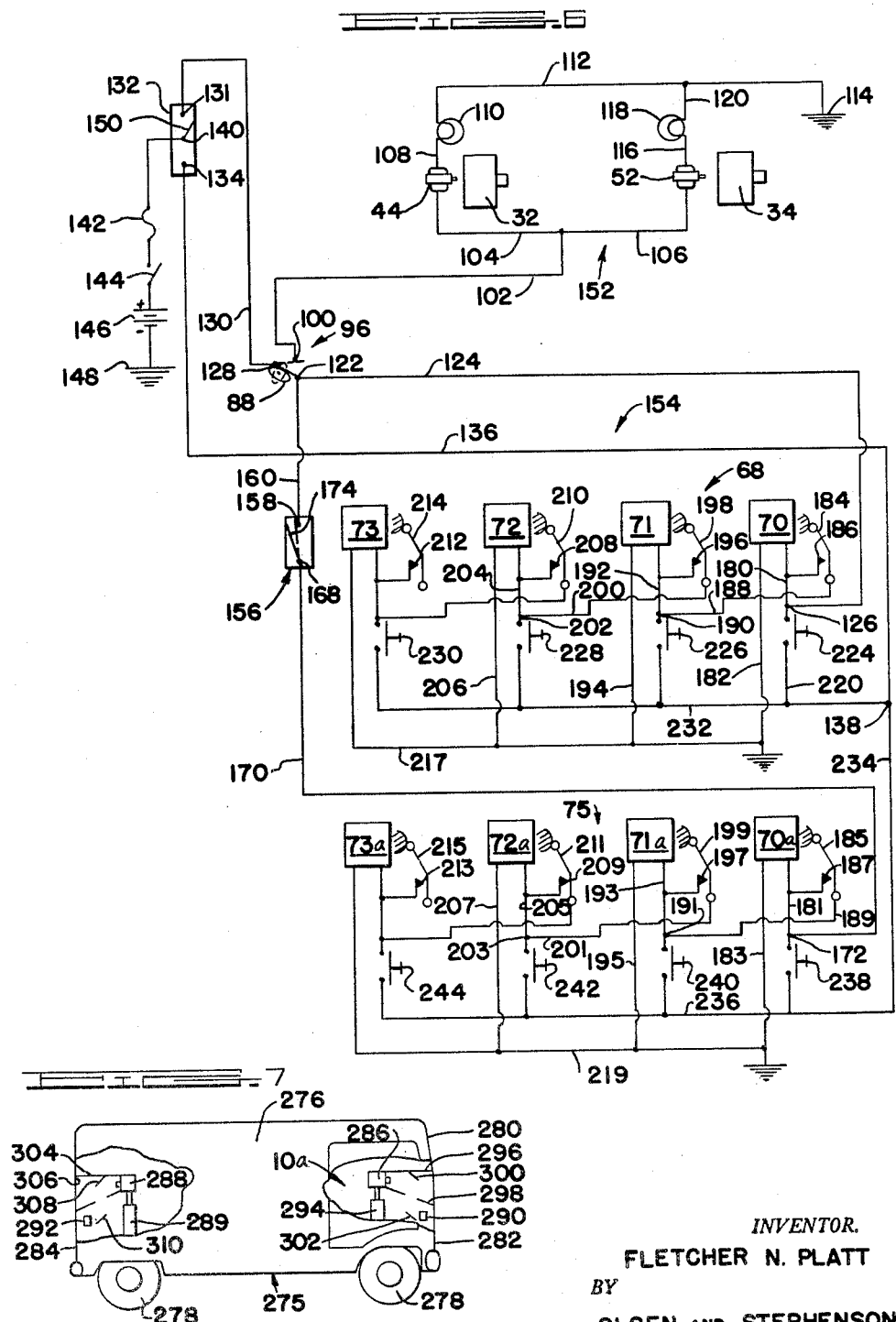

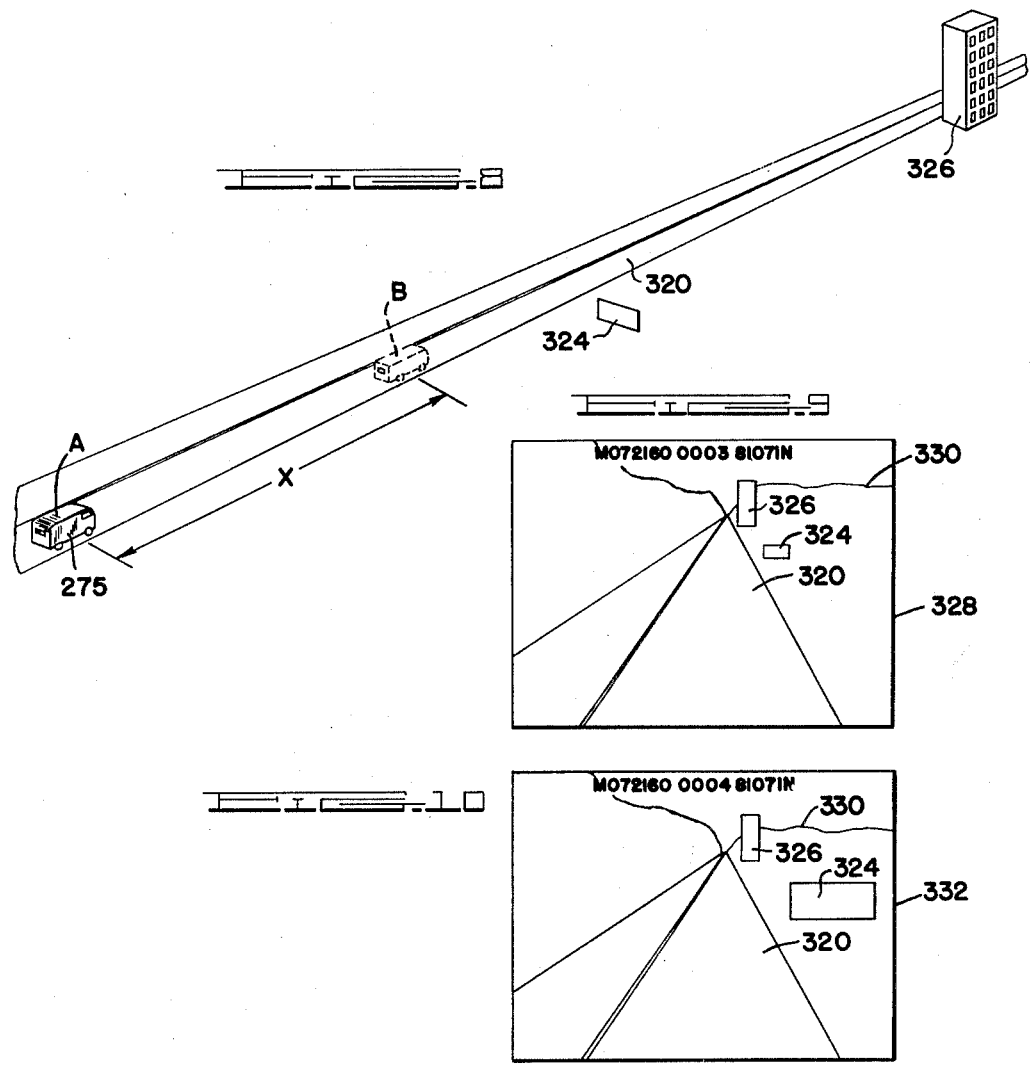

United States Patent Office 3,141,393
Patented July 21, 1964

3,141,393
APPARATUS FOR OBTAINING ROADWAY
PHOTOGRAPHS
Fletcher N. Platt, Ann Arbor, Mich., assignor to Photo/
File Surveys Inc., Ann Arbor, Mich., a corporation of
Delaware
Filed Mar. 14, 1961, Ser. No. 95,626
11 Claims. (Cl. 95—1.1)

This invention relates generally to a system for photo-recording highways and appurtenances and more particularly to an improved apparatus for obtaining identified successive photographs of a roadway from a moving vehicle on the roadway.

A record of highway information consisting of photographs of the highway and adjacent areas, as seen from the driver's point of view, is very desirable for many reasons. Such information facilitates the work of highway departments, law enforcement officials, and others in making studies relating to traffic signs, traffic channeling, roadway redesigns, maintenance needs, accident patterns, encroachments, and the like.

The value of this information is enhanced when it can be used to locate precise points on the highway, such as when visibility over a hill is blocked and when the line of sight of the driver is unobstructed, and when it can be used to determine the dimensions of roadway appurtenances such as signs, trees, and the like.

It is an object of this invention, therefore, to provide an improved apparatus for obtaining a photographic record of highways and appurtenances consisting of individual photographs which are taken from the driver's eye level, in most cases, are readily identified by indicia in the photograph, and can be readily filed for quick reference. In the apparatus of this invention, a vehicle is equipped with a camera which automatically advances the film and actuates the shutter, and an example of which is a motion picture camera, and which is operated intermittently to individually expose successive frames of the film therein so as to obtain a series of photographs of the roadway area as the vehicle is advanced on the roadway. A data board, arranged so that the information thereon appears in each photograph, identifies the roadway, the data of the photograph, and automatically numbers the photographs in sequence. The numbering is accomplished by using an odometer cable actuated counter which is controlled so that it operates out of phase with the camera shutter. In other words, the counter operates following each actuation of the camera shutter so that a clear number identification of each photograph is obtained, since each time the camera is actuated, the counter is in a number indicating position.

An important feature of this invention is the odometer actuation of the camera so that successive photographs represent views of the roadway from a vehicle positioned at two points on the roadway which are spaced a predetermined distance apart. This distance is maintained constant for the photographs on a given reel of film, so that a highway department official or the like who normally maintains a reference file on the location of important bridges, intersections and the like on particular roads can readily advance a reel of film to the portion which shows photographs of a particular bridge or intersection. This is facilitated by the use of projectors which have counters related to the counter appearing in the photographs. Importantly, this arrangement of the photographs also makes it possible to determine the dimensions of objects appearing in the photographs. Knowing the distance traveled by the vehicle between successive photographs and knowing the camera parameters, such as focal length, etc., the actual physical dimensions of objects appearing in successive photographs can readily be determined by known methods by comparing the sizes of objects in the successive photographs. Also, since the counter number appearing in a photograph is related to the distance traveled by the vehicle from a given point, it can be used to calculate the exact location on the roadway from which the photograph was taken. The apparatus of this invention is also adaptable to railway use in photographing the roadway and adjacent areas traveled by trains, and other geometric data indicators such as an inclinometer, compass, etc., can be mounted on the data board along with the counter.

Further objects, features and advantages of this invention will become apparent from a consideration of the following description, the appended claims, and the accompanying drawing in which:

FIGURE 1 is a side elevational view of a vehicle equipped with the photographic apparatus of this invention, with some parts of the vehicle broken away for purposes of clarity;

FIGURE 2 is a fragmentary elevational view of a portion of the dashboard in the vehicle shown in FIG. 1, illustrating the control panel for the photographic apparatus of this invention;

FIGURE 3 is a perspective view of a portion of the control mechanism in the photographic apparatus of this invention;

FIGURES 4 and 5 are elevational views of the data boards in the photographic apparatus of this invention, looking substantially along the lines 4—4 and 5—5 in FIG. 1;

FIGURE 6 is a circuit diagram of the control apparatus for the cameras and counters in the apparatus of this invention;

FIGURE 7 is a side elevational view of a station wagon or panel truck-type vehicle equipped with a modified form of the apparatus of this invention;

FIGURE 8 is a diagrammatic perspective view of a roadway showing a vehicle thereon in two successive photograph taking locations; and FIGURES 9 and 10 are diagrammatic representations of the photographs taken in the two vehicle locations illustrated in FIG. 8.

With reference to the drawing, the photographic apparatus of this invention, indicated generally at 10, is illustrated in FIG. 1 mounted on an automobile 12 having road wheels 14, a rear seat 16, a front seat 18, a steering wheel 20, and a dashboard 22. The automobile 12 also has the usual hood 24, windshield 26, rear window 28, and rear deck 30. The apparatus 10 includes a forwardly facing camera 32 and a rearwardly facing camera 34, each of which is of a type that automatically advances the film and actuates the shutter and each of which operates on relatively narrow strip film, such as sixteen mm. motion picture film, a data board 36 mounted on the automobile hood 24, and a data board 38 mounted on the rear deck 30. The camera 32 is provided with a lens of a focal length such that each photograph includes a picture of the data board 36 on the hood 24 in addition to a picture of a roadway being traveled by the vehicle 12 and the scene along the sides of the roadway, particularly the right side of the roadway looking in the direction of travel by the vehicle 12.

The camera 34 is likewise provided with a lens of a focal length such that each photograph taken with the camera 34 includes a picture of the data board 38, a picture of the roadway behind the vehicle 12 and the scene of the roadway on both sides thereof particularly the right-hand side of the roadway when viewed from the camera 34 looking in the direction of the data board 38. Each of the cameras 32 and 34 is directed so that a picture of the data board which is photographed appears in the lower portion of each photograph taken.

The cameras 32 and 34 may be mounted on any suitable supports which are adjustable vertically to adjust the positions of the cameras above the roadway and which permit turning of the cameras about vertical axes so that the cameras can be directed toward desired portions of the roadway. In the illustrated embodiment of the invention, the camera 32 is mounted on a telescopic support 40 which is mounted on the vehicle floorboard and is adjustable vertically and permits rotation of the camera 32 about the vertical axes of the support 40. The camera 34 is similarly mounted on a telescopic support 42 mounted adjacent the rear seat 16. The shutter on the camera 32 is actuated by a solenoid 44 which is connected by a two wire cord 46 to a socket 48 (FIG. 2) in a control panel 50 mounted on the vehicle dashboard 22. The shutter on the camera 34 is actuated by a solenoid 52 which is connected by a two wire cord 54 to a second socket 56 in the control panel 50.

The front data board 36 consists of a body or frame 58 which is secured by a suitable bracket 60 and bolts 62, to the vehicle hood 24. A first group of numbers and the letter "M," indicated generally at 64, are removably mounted on the side of the frame 58 adjacent the vehicle windshield 26 to identify the state in which the photographs are being taken and the date on which the photographs are being taken. In the illustrated embodiment of the invention (FIG. 4) the letter "M" indicates that the photographs are being taken in Michigan and the numbers "072160" indicate the date on which the photographs are being taken namely, July 21, 1960. A second group 66 of numbers indicate the state, Federal or county route number. The letter "N" indicates the direction of travel, namely, north, on the identified road.

A counter assembly 68 is mounted on the frame 58 at a position between the identifying groups of numbers 64 and 66. The assembly 68 consists of four substantially identical counter units 70, 71, 72 and 73 which are connected so that the assembly 68 is operable to indicate any number thereon between "0000" and "9999." The assembly 68 is illustrated as consisting of four counter units 70, 71, 72 and 73 and it is to be understood that more or less than this number may be used in the apparatus of this invention if desired.

The rear data board 38 (FIG. 5) consists of a frame or body 65 which is mounted on a bracket 67 secured by bolts 69 to the rear deck 30 and includes identifying indicia like the number and letter groups 64 and 66 on the data board 36. Since the camera 34 takes photographs which indicate the view from a vehicle traveling in a direction opposite the direction the vehicle 12 is traveling, the identifying route number "81071" is followed by the letter "S" indicating south. A counter assembly 75, which consists of a plurality of counter units 70a, 71a, 72a and 73a, corresponding to the units 70, 71, 72 and 73 in the data board 36, is mounted on the frame 65.

The counter units may be of any suitable electrically actuated type in which counter is actuable intermittently to expose successive numbers thereon, in other words, the counter unit must be of a type which stops in each number indicating position as contrasted to a type in which the numbers are continually moving. In a preferred embodiment of the invention, each counter unit is of electrical impulse type manufactured by Sodeco of Geneva, Switzerland, and sold by Landis and Gyr, Inc., 45 West 45th Street, New York 36, N.Y. Since the counters by themselves form no part of the present invention, they are not described in detail herein. Each unit includes a counting drum 76 which is numbered from zero to nine and which is operated by electro-magnetic armature action. At each impulse, an armature actuated escapement advances the drum by a half of a figure with the remaining half figure advance taking place when the armature is released and returned by spring action to an off position.

Mounted on the rear side of the dashboard 22 is a housing 80 (FIG. 3) for a camera and data board synchronizing assembly 82. The assembly 82 includes a shaft 84 journaled on the housing and formed intermediate its ends with a bevel gear section 86. A cam 88 is fixed on the shaft 84 at a position spaced from gear section 86. A flexible shaft 90, connected in a conventional manner to one of the vehicle wheels 14, or to an additional fifth ground wheel (not shown) provided on the vehicle 12, so that the shaft 90 is driven through a predetermined number of revolutions for each mile of roadway traveled by the vehicle 12, is connected in a driving relation to a stub shaft 92 rotatably mounted on the housing 80. A bevel gear 94 fixed on the stub shaft 92 is positioned in meshing engagement with the gear section 86 on the shaft 84 so that the shaft 84 is driven by the flexible shaft 90 through a predetermined number of revolutions for each mile traveled by the vehicle 12. In a conventional automobile odometer mechanism, the drive shaft for the mechanism rotates 10 times per mile of travel of the vehicle. In the apparatus of this invention, it is convenient to use this same odometer shaft as the flexible shaft 90 and provide the necessary ratio between the gears 86 and 94 so that the cameras 32 and 34 are actuated at predetermined desired intervals of roadway travel to provide for successive photographs of equally and uniformly spaced portions of the roadway.

A two position switch 96 having an actuating arm 98 which is maintained in engagement with the cam 88 is mounted on the housing 80. The switch 96 includes a first terminal 100 (FIGS. 3 and 6) which is connected by a conductor 102 to the control panel sockets 48 and 56. A conductor 104, in the cord 46, connects the socket 48 and the solenoid 44 when the cord 46 is plugged into the socket 48. A conductor 106 in the cord 54 connects the socket 56 and the solenoid 52 when the cord 54 is plugged into the socket 56. A second conductor 108 in the cord 46 connects the solenoid 44 in series with an indicator light 110 in the control panel 50 when the cord 46 is plugged into the socket 48. A conductor 112 provides for a connection of the the light 110 to ground at 114. A second conductor 116 in the cord 54 connects the solenoid 52 in series with a second indicator light 118 in the control panel 50 when the cord 54 is plugged into the socket 56. The light 118 is connected by conductor 120 to the conductor 112 so that the light 118 is likewise grounded at 114.

A second terminal 122 in the two position switch 96 is connected by a conductor 124 to a terminal 126 in the counter assembly 68. A third terminal 128 in the switch 96 is connected by a conductor 130 to a terminal 131 in a master switch 132 mounted on the control panel 50. A second terminal 134 in the master switch 132 is connected by a conductor 136 to a terminal 138 in the counter assembly 68. A third terminal 40 in the master switch 132 is connected through a fuse 142 in the instrument panel 50 and the vehicle ignition switch 144 to the vehicle battery 146 which is grounded at 148. The master switch 132 includes a switch blade 150 which is movable between a first position in which it connects the terminals 140 and 131, a second position in which it connects the terminals 140 and 134 and a third "off" position in which it is connected only to the terminal 140 and does not engage either the terminal 131 or the terminal 134.

The two position switch 96 is operable when the arm 98 is in engagement with the high side of the cam 88 to connect the terminals 128 and 100 as shown diagrammatically in broken lines in FIG. 6 and when the arm 98 is in engagement with the low side of the cam 88 to connect the terminals 128 and 122, as shown in full lines. Thus, on rotation of the cam 88, the switch 96 operates to alternately connect the terminal 128 with the terminals 100 and 122 so as to alternately energize a camera circuit, indicated generally at 152, which includes the camera actuating solenoid 44 and 52, and a counter circuit, indicated generally at 154, which includes the counter assemblies 68 and 75. Either or both of the cameras 32 and 34 may be actuated on energization of the circuit 152 depending on whether or not one or both of the cords 46 and 54 are plugged into the control panel 50.

The counter circuit 154 includes the impulse counter units 70, 71, 72 and 73 and the units 70a, 71a, 72a and 73a and a switch 156 which is operable to disconnect the counter units 70a, 71a, 72a and 73a from the circuit 154 when the rear camera 34 is not being used. The switch 156 includes a first terminal 158 which is connected by a conductor 150 to the two position switch terminal 122. A second terminal 168 in the switch 156 is connected by a conductor 170 to a terminal 172 in the counter unit 70a. A contact blade 174 in the switch 156 is connected to the terminal 168 and is movable between a first "open" position, shown in full lines in FIG. 6, spaced from the terminal 158 and a second "closed" position, shown in broken lines in FIG. 6, engaged with the terminal 158.

When current is supplied through the conductor 124 to the counter terminal 126, it flows through a conductor 180 to the actuating armature for the counter 70, the armature being grounded through a conductor 182. When the armature is energized, the drum 76 is advanced half a unit, for example, half way between positions fully indicating the numbers "4" and "5," and when the supply of current to the terminal 126 is stopped, the armature is de-energized and drum 76 completes its movement to the next number indicating position, in this example the number "5." When current is supplied to the counter 70 so as to move the drum 76 from "9" to "0," an arm 184 in the counter 70 engages a terminal 186 connected to the conductor 180 so that current from the terminal 126 flows through the conductor 180, the terminal 186 and the arm 184 to a conductor 188 which is connected to the arm 184 and to a terminal 190 in the counter unit 71 which corresponds to the terminal 126 in the counter unit 70. Current flows from the terminal 190 through a conductor 192 to the actuating armature for the counter unit 71, which armature is grounded through a conductor 194. As a result, the counter unit 71 is advanced one number. A terminal 196 in the unit 71 coacts with an arm 198 and a conductor 200 to provide for energization of the armature for the counter unit 72 when the unit 71 is moved from "9" to "0" number indicating positions. The conductor 200 is connected to a terminal 202 in the unit 72 and the terminal 202 is in turn connected through a conductor 204 to the armature in the unit 72 which is grounded through a conductor 206. The unit 72 likewise has a terminal 208 and an arm 210 which coact to provide for energization of the armature for the counter unit 73 when the unit 72 is moving between "9" and "0" number indicating positions. The counter unit 73 likewise has a coacting terminal 212 and arm 214, like the arm 184 and terminal 186 in unit 70, but since the unit 73 is the last counter in the assembly 68, these elements do not function in the circuit. A conductor 217 connects the armature in unit 73 to ground.

It can thus be seen that the counter units 70, 71, 72 and 73 are connected so as to move intermittently to indicate consecutively increasing numbers. For example, assume that the counter assembly 68 shows the number "5999." When the armature for the unit 70 is next energized, in response to movement of switch 96 to the position shown in full lines in FIG. 6, the counter assembly is moved to indicate the number "6000." The counter units 70a, 71a, 72a and 73a are similarly connected. However, these units are modified so that in response to energization of the armatures therefor, the number indicated thereon is decreased instead of increased as in the counter assembly 68. Stated otherwise, each time the armature for the unit 70a is energized, the number on the drum therefor is moved down one digit and each time the counter unit 70a moves from "0" to "9," the armature for the unit 71a is energized so as to move the drum for the unit 71a to a position indicating one less number. For example, if the number indicated on the data board 38 is "8760," and the armature for the unit 70a is energized, the unit 70a is moved to a position indicating the number "9" and the unit 71a is moved to a position indicating the number "5" so that the resulting number on the data board 38 is "8759."

In the counter assembly 75, the terminal 172 corresponds to the terminal 126 in the assembly 68. When current is supplied to the terminal 172 it flows through a conductor 181 to the actuating armature for the counter 70a, the armature being grounded through a conductor 183. The armature advances the numeral carrying drum for the counter unit 70a, half a numeral, for example, mid way between positions fully indicating the numbers "4" and "3," and when the supply of current to the terminal 172 is stopped, the armature is deenergized and the counter unit drum completes its movement to the next number indicating position, in this example the number "3." When current is supplied to the counter 70a so as to move the drum therefor from "0" to "9," an arm 185 in the unit 70a engages a terminal 187 connected to the conductor 181 so that current from the terminal 172 flows through the conductor 181, the terminal 187 and the arm 185 to a conductor 189 which is connected to the arm 185 and to a terminal 191 in the counter unit 71a which corresponds to the terminal 172 in the unit 70a. Current flows from the terminal 191 through a conductor 193 to the actuating armature for the counter unit 71a, which armature is grounded through a conductor 195. As a result, the counter unit 71a is advanced one number. A terminal 197 in the unit 71a coacts with an arm 199 and a conductor 201 to provide for energization of the armature for the counter unit 72a when the unit 71a is moved from "0" to "9" number indicating positions. The conductor 201 is connected to a terminal 203 in the unit 72a and the terminal 203 is in turn connected through a conductor 205 to the armature in the unit 72a which is grounded through a conductor 207. The unit 72a likewise has a terminal 209 and an arm 211 which coact to provide for energization of the armature for the counter unit 73a when the unit 72a is moving between "0" and "9" number indicating positions. The counter unit 73a also has a coacting terminal 213 and arm 215, like the arm 184 and terminal 186 in unit 70, but since the unit 73a is the last counter in the assembly 75, these elements do not function in the circuit. A conductor 219 connects the armature in unit 73a to ground.

The terminal 126 for the counter 70 is connected to a conductor 220 which includes a pair of spaced terminals 222 adapted to be connected by a manual switch 224 mounted on the instrument panel 50. Switches 226, 228 and 230 are similarly connected in circuit with their respective counters 71, 72 and 73. A conductor 232 is connected to the switches 224, 226, 228 and 230 and to the terminal 138. As a result, when current is supplied to the terminal 138, each switch 224, 226, 228 and 230 is separately operable to actuate its counter to move it to a desired number indicating position. Thus, the switches 224, 226, 228 and 230 are operable to reset the counter assembly 68. A conductor 234, connected to the terminal 138 and to a conductor 236 makes possible the operation of similar reset switches 238, 240, 242 and 244 for resetting the counters 70a, 71a, 72a and 73a, when current is supplied to terminal 138.

In the operation of the apparatus 10, assume that photographs are to be taken of a particular roadway and that the data boards 36 and 38 have been equipped with the proper identifying indicia such as the number and letter groups 64 and 66. The ignition switch 144 is closed and the master switch 132 is moved to the reset position in which the blade 150 extends between the terminals 140 and 134, so that current is supplied to the terminal 138. The reset buttons 224, 226, 228 and 230 are then actuated to move the counters 70, 71, 72 and 73, respectively, to positions in which the number "0000" is indicated on the data board 36. The reset switches 238, 240, 242 and 244 are actuated to move the counter units 70a, 71a, 72a and 73a, respectively, to positions indicating the number "9999" on the rear data board 38. If the rear camera 34 is to be used concurrently with the front camera 32, the switch 156 is moved to a "closed" position in which the blade 174 extends between the terminals 168 and 158. If the rear camera 34 is not to be used, the switch 156 is moved to its "open" position so that the rear counter units are out of the counter circuit 154.

Assume that both camera units 32 and 34 are to be used. The master switch 132 is moved to a position in which the blade 150 extends between the terminals 140 and 131. As the vehicle 12 advances along the roadway, shaft 84 is rotated to in turn rotate the cam 88 so as to alternately connect terminal 128 in the two position switch 96 with the terminals 100 and 122 and thus alternately energize the camera circuit 152 and the counter circuit 152. Each time the camera circuit 152 is energized, the solenoids 44 and 52 are energized to actuate the cameras 32 and 34 so as to take photographs of the roadway. Camera 32 takes a photograph of the roadway ahead of the vehicle 12 and includes in the photograph a picture of the data board 36. In one embodiment of the invention the camera 32 is positioned 48 inches above the roadway surface to that it is at a height approximating the eye level of an automobile driver. The camera 34 is positioned at the same height and takes a picture of the roadway behind the vehicle 12 approximating the view of the roadway seen by an automobile driver on the opposite side of the road and traveling in a direction opposite to the direction of travel of the vehicle 12. A picture of the data board 38 is included in each photograph taken with the camera 34. It is to be understood that the cameras 32 and 34 may be raised or lowered if views of the roadway other than those seen by an automobile driver are desired. Each time a solenoid 44 or 52 is energized, the motion picture film on the camera therefor is advanced substantially one frame so that a single frame photograph is taken each time a camera is energized.

Each time the counter circuit 154 is energized the front counter assembly 68 advances one number and the rear counter assembly 75 decreases by one number. In other words, the front counter indicates the number "0001" and the rear counter the number "9998" the first time the counter circuit 154 is energized. Since the counter assemblies 68 and 75 are actuated intermittently and in between actuations of the cameras 32 and 34, each time a photograph is taken of a counter, the counter is in a number indicating position. In other words, a counter cannot be in a position in between number indicating positions when a photograph is taken. It is to be understood also that while the operation of the apparatus of this invention has been particularly described and illustrated with respect to running the front counter assembly up and the rear counter assembly 75 down, it is within the purview of this invention to connect both counter assemblies in their respective circuits so that they both run up or down as desired.

Each time the solenoid 44 is energized so that the camera 32 takes a picture the indicating light 110 therefor flashes on and each time the solenoid 52 for the camera 34 is energized the indicating light 118 therefor flashes on. Consequently, the vehicle driver is constantly aware of whether or not his cameras are being actuated. The film taken with the cameras 32 and 34 of a particular roadway is removed from the cameras and developed to obtain a series of identified photographs showing the driver's view traveling in both directions on the roadway which is identified in the photographs. Since the counter number indicated in each photograph is related to the distance traveled by the vehicle from its starting point, the exact location of each picture is readily determined.

In the event only pictures of one side of the roadway are desired, the cord 54 for the rear camera 34 is unplugged from the socket 56 and the switch 156 is opened. Under these conditions, neither the rear camera 34 nor the rear counter assembly 75 will operate during travel of the vehicle.

A modified form of the photographic apparatus of this invention, indicated generally at 10a is illustarated in FIG. 7 mounted on a vehicle 275 of station wagon or panel truck type. The vehicle 275 has a body 276, road wheels 278, a windshield 280, a front panel 282 located below the windshield 280 and a rear panel 284. The apparatus 10a includes a pair of cameras 286 and 288 corresponding to the cameras 32 and 34 in the apparatus 10 and a pair of data boards 290 and 292 corresponding to the data boards 36 and 38 in the apparatus 10. The camera 286 is mounted on an adjustable support 294, like the support 40 for camera 32, and is positioned at the rear end of a tapered tubular member 296 which has its front end disposed in an opening 298 in the front vehicle panel 282. A pair of mirrors 300 and 302 are mounted on the vehicle 285 to that an image of the data board 290 appears in the mirror 300. The camera 286 is directed so that a picture of this image of the data board will appear in each photograph of the roadway. The rear camera 288 is similarly mounted on an adjustable support 289 and is positioned at the rear end of a tapered tubular member 304 which extends through an opening 306 in the rear vehicle panel 284. A pair of mirrors 308 and 310 are mounted so that an image of the data board 292 in the mirror 308 will be included in each photograph of the roadway taken with the camera 288. In all other respects, the apparatus 10a is identical to the apparatus 10, the advantage of the apparatus 10a being that the cameras 286 and 288 do not photograph the roadway through glass windows as is the case in the apparatus 10 in which the front camera 32 photographs the roadway as seen through the windshield 26 and the rear camera 34 photographs the roadway as seen through the rear window 28. Thus, any tendency of the glass to blur the photographs is eliminated in the apparatus 10a.

The improved method of this invention for obtaining roadway photographs which are usable to precisely locate and determine the physical dimensions of roadway appurtenances is illustrated diagrammatically in FIGS. 8, 9 and 10. The vehicle 275, equipped with the apparatus 10a, is shown in FIG. 8 traveling on a roadway 320 which has a sign or the like 322 mounted adjacent one side thereof. A large building 324 is also disposed adjacent the roadway 320 some distance from the sign 322. Assume that the vehicle 275 is traveling in a direction toward the sign 324 and has proceeded to the position shown in solid lines and indicated at A in FIG. 8. At position A, the odometer actuated synchronizing assembly 82 provides for actuation of the front camera 286 to photograph the roadway ahead of the forwardly traveling vehicle 275. A diagrammatic representation of the photograph taken by the camera 286 in position A of vehicle 275 is shown at 328 in FIG. 9. The sign 324, building 326, roadway 320, background 330 and photograph identifying indicia appear in photograph 328.

When the vehicle 275 has proceeded along the roadway 320 a predetermined distance determined by the synchronizing assembly 82, which distance is indicated at "x" in FIG. 8, the camera 286 is again actuated to take another photograph, indicated at 332 in FIG. 10. When photograph 332 is taken, vehicle 275 is in the position indicated at B in FIG. 8. Each time the vehicle 275 travels the distance "x" a photograph is taken and in between photographs the counter in the data board 290 is actuated so that successive photographs are numbered consecutively as shown in FIGS. 9 and 10 in which the photographs 328 and 332 are numbered "3" and "4," respectively. The sign 322 appears much larger in photograph 332 than it does in photograph 328 while the larger background building 324 is substantially the same size in both photographs. The actual size of the sign 322 can be readily calculated by comparing the dimensions appearing in FIGS. 9 and 10, since the parameters of camera 286 are known as is the distance "x." Subsequent photographs will enable a calculation of the size of building 324. Since the distance "x" is known, the photographs can also be used to pinpoint the location on roadway 320 of the objects 324 and 326.

It will be understood that the specific construction of the improved apparatus for photo-recording highways and appurtenances which is herein disclosed and described is presented for purposes of explanation and illustration and is not intended to indicate limits of the invention, the scope of which is defined by the following claims:

I claim:

1. Apparatus for taking a series of photographs from a moving vehicle showing the roadway traveled by the vehicle and means identifying each photograph, said apparatus comprising a vehicle, a camera mounted on said vehicle a predetermined distance above said roadway and facing so as to be capable of taking a photograph showing a scene of the roadway corresponding substantially to the view of a vehicle driver, photograph identification means including a counter mounted on said vehicle so that a picture thereof is included in each photograph of said roadway taken with said camera, said counter being intermittently operable to expose successive numbers thereon to view of said camera, means for actuating said counter each time said vehicle travels a predetermined distance, means for actuating said camera through a cycle of exposure, and control means providing for alternate operation of said counter and camera actuating means so that said camera is actuated between successive actuations of said counter so that each photograph of said roadway includes a picture of said counter in a number exposing position thereof.

2. In a vehicle, a camera mounted so that on operation thereof a photograph of the roadway being traveled by the vehicle is taken which shows a view corresponding to a driver's view of the roadway, photograph identification means including an electrically operable counter which moves between successive number indicating positions in response to supply of electric current thereto, means mounting said identification means on said vehicle so that a picture thereof appears in each photograph taken with said camera, electrically operable means for operating said camera through a cycle of exposure, and control means operable to alternately complete a circuit to said counter and complete a circuit to said electrically operable means so that said counter is advanced to the successive number indicating positions thereof between successive operations of said camera.

3. In a vehicle having ground wheels, a forwardly facing camera mounted so as to photograph the roadway being traveled by the vehicle, a data board mounted on said vehicle forwardly of said camera so that a picture thereof appears in each photograph taken of the roadway with said camera, an electrically responsive counter mounted on said data board and movable between successive number indicating positions each time current is supplied thereto, electrically responsive means connected to said camera for operating the camera to take a photograph each time current is supplied to said electrically responsive means, a two position switch operable in one position to complete a circuit to said counter and in another position to complete a circuit to said camera operating means, and means responsive to rotation of one of said ground wheels for moving said switch between said positions.

4. In a vehicle having ground wheels, a forwardly facing camera mounted so as to photograph the roadway being traveled by the vehicle, a data board mounted on said vehicle forwardly of said camera so that a picture thereof appears in each photograph taken of the roadway with said camera, an electrically responsive counter mounted on said data board and movable between successive number indicating positions each time current is supplied thereto, electrically responsive means connected to said camera for operating the camera to take a photograph each time current is supplied to said electrically responsive means, a two position switch operable in one position to complete a circuit to said counter and in another position to complete a circuit to said camera operating means, shaft means operatively associated with one of said ground wheels for rotation in response to ground travel of said one wheel, a cam member driven by said shaft means, and an actuating arm for said switch engaged with said cam member and operable on rotation of said cam member to move said switch back and forth between said two positions.

5. In a vehicle having ground wheels, a forwardly facing camera mounted so as to photograph the roadway being traveled by the vehicle, a data board mounted on said vehicle forwardly of said camera so that a picture thereof appears in each photograph taken of the roadway with said camera, an electrically responsive counter mounted on said data board and movable between successive number indicating positions each time current is supplied thereto, electrically responsive means connected to said camera for operating the camera to take a photograph each time current is supplied to said electrically responsive means, a two position switch operable in one position to complete a circuit to said counter and in another position to complete a circuit to said camera operating means, shaft means operatively associated with one of said ground wheels for rotation in response to ground travel of said one wheel, a cam member driven by said shaft means, an actuating arm for said switch engaged with said cam member and operable on rotation of said cam member to move said switch back and forth between said two positions, and an indicating light connected in circuit with said camera operating means.

6. In a vehicle having ground wheels, a forwardly facing camera mounted on said vehicle so as to photograph the roadway being traveled by the vehicle, electrically responsive means connected to said camera for operating the camera to take a photograph each time current is supplied thereto, a photograph identifying member mounted on said vehicle so that a picture thereof appears in each photograph taken with said camera, a plurality of counter units mounted side by side on said identifying member and connected together so that they are operable to indicate a number thereon having a plurality of digits and movable so as to indicate consecutive numbers, each of said units being operable to expose different numbers thereon and being electrically operable so that each time current is supplied thereto said unit is moved to expose the next successive number thereon, a control panel on said vehicle having a plurality of switches corresponding to said counter units, each of said switches being operable on actuation thereof to provide for a flow of current to its corresponding counter unit, a master switch on said control panel movable to a first position completing a circuit to said counter unit switches to provide for flow of current to said counter unit switches and a second position opening the circuit to said counter unit switches and closing an operating circuit which includes said counter units and said camera operating means, a two position switch in said operating circuit movable between a first position in which current is supplied to said camera operating means and a second position in which current is supplied to said counter units, a cam operatively associated with said two position switch and operable on rotation thereof to provide for back and forth movement of said switch between said two positions, and means for rotating said cam in response to travel of said vehicle on the roadway.

7. In a vehicle having ground wheels, a forwardly facing camera mounted on said vehicle so as to photograph the roadway being traveled by the vehicle, electrically responsive means connected to said camera for operating the camera to take a photograph each time current is supplied thereto, a photograph identifying member mounted on said vehicle so that a picture thereof appears in each photograph taken with said camera, a plurality of counter units mounted side by side on said identifying member and connected together so that they are operable to indicate a number thereon having a plurality of digits and movable so as to indicate consecutive numbers, each of said units being operable to expose different numbers thereon and being electrically operable so that each time current is supplied thereto said unit is moved to expose the next successive number thereon, a master switch on said control panel movable to a position closing an operating circuit which includes said counter units and said camera operating means, a two position switch in said operating circuit movable between a first position in which current is supplied to said camera operating means and a second position in which current is supplied to said counter units, a cam operatively associated wtih said two position switch and operable on rotation thereof to provide for back and forth movement of said switch between said two positions, and means for rotating said cam in response to travel of said vehicle on the roadway.

8. In a vehicle having ground wheels, a forwardly facing camera mounted on said vehicle so as to photograph the roadway being traveled by the vehicle, electrically responsive means connected to said camera for operating the camera to take a photograph each time current is supplied thereto, a photograph identifying member mounted on said vehicle so that a picture thereof appears in each photograph taken with said camera, a plurality of counter units mounted side by side on said identifying member and connected together so that they are operable to indicate a number thereon having a plurality of digits and movable so as to indicate consecutive numbers, each of said units being operable to expose different numbers thereon and being electrically operable so that each time current is supplied thereto said unit is moved to expose the next successive number thereon, a control panel on said vehicle having a plurality of switches corresponding to said counter units, each of said switches being operable on actuation thereof to provide for a flow of current to its corresponding counter unit, a master switch on said control panel movable to a first position completing a circuit to said counter unit switches to provide for flow of current to said counter unit switches and a second position opening the circuit to said counter unit switches and closing an operating circuit which includes said counter units and said camera operating means, a two position switch in said operating circuit movable between a first position in which current is supplied to said camera operating means and a second position in which current is supplied to said counter units, a cam operatively associated with said two position switch and operable on rotation thereof to provide for back and forth movement of said switch between said two positions, and an odometer cable arranged in a driving relation with said cam to provide for a predetermined number of rotations thereof for each unit of travel of said vehicle on the roadway.

9. In a vehicle having ground wheels, a forwardly facing camera mounted on said vehicle so as to photograph the roadway being traveled by the vehicle, a rearwardly facing camera mounted on said vehicle so as to photograph the roadway behind the vehicle, electrically responsive means connected to each of said cameras for operating the camera simultaneously to take photographs each time current is supplied thereto, a photograph identifying member for each of said cameras mounted on said vehicle so that a picture thereof appears in each photograph taken with said cameras, a plurality of counter units mounted side by side on each of said identifying members and connected together so that they are operable to indicate a number thereon having a plurality of digits and movable so as to indicate consecutive numbers, each of said units being operable to expose different numbers thereon and being electrically operable so that each time current is supplied thereto said unit is moved to expose the next successive number thereon, a control panel on said vehicle having a plurality of switches corresponding to said counter units, each of said switches being operable on actuation thereof to provide for a flow of current to its corresponding counter unit, a master switch on said control panel movable to a first circuit position completing a circuit to said counter unit switches to provide for flow of current to said counter unit switches and a second position opening the circuit to said counter unit switches and closing an operating circuit which includes said counter units and said camera operating means, a two position switch in said operating circuit movable between a first position in which current is supplied to said camera operating means and a second position in which current is supplied to said counter units, a cam operatively associated with said two position switch and operable on rotation thereof to provide for back and forth movement of said switch between said two positions, and means for rotating said cam in response to travel of said vehicle on the roadway.

10. In a vehicle, a camera mounted so that an operation thereof a photograph of the roadway being traveled by the vehicle is taken which shows a view corresponding to a driver's view of the roadway, photograph identification means including an electrically operable counter which advances one number indicating position each time electric current is suppled thereto, means mounting said identification means on said vehicle so that a picture thereof appears in each photograph taken with said camera, electrically operable means for operating said camera through a cycle of exposure, control means operable to alternately complete a circuit to said counter and complete a circuit to said electrically operable means so that said counter is advanced to the successive number indicating positions thereof between successive operations of said camera, and means operating said control means in response to forward travel of said vehicle on the roadway.

11. In a vehicle, a camera mounted so that on operation thereof a photograph of the roadway being traveled by the vehicle is taken which shows a view corresponding to the driver's view of the roadway, photograph identification means including an electrically operable counter which advances one number indicating position each time electric current is supplied thereto, means mounting said identification means on said vehicle so that a picture thereof appears in each photograph taken with said camera, electrically operable means for operating said camera, control means including a rotatable cam member operable to alternately complete a circuit to said counter and complete a circuit to said electrically operable means so that said counter is advanced to the successive number indicating positions thereof between successive operations of said camera, and means rotating said cam member in response to forward travel of said vehicle on the roadway.

References Cited in the file of this patent
UNITED STATES PATENTS 2,336,081     Finnegan _____ Dec. 7, 1943

FOREIGN PATENTS 831,507     Great Britain _____ Mar. 30, 1960